United States Patent [19]

Wagner

[11] Patent Number: 4,607,858
[45] Date of Patent: Aug. 26, 1986

[54] REMOVABLE HITCH

[75] Inventor: Howard W. Wagner, Grand Island, Nebr.

[73] Assignee: Wood's Welding Inc., Grand Island, Nebr.

[21] Appl. No.: 716,443

[22] Filed: Mar. 26, 1985

[51] Int. Cl.[4] .............................................. B60D 1/06
[52] U.S. Cl. ................................ 280/491 E; 280/457; 280/501; 280/511
[58] Field of Search .............. 280/491 R, 491 E, 499, 280/500, 501, 502, 511, 415 R, 490 R, 512, 513, 457

[56] References Cited

U.S. PATENT DOCUMENTS

| 2,072,473 | 3/1937 | Baumberger | 280/490 R |
| 2,372,271 | 3/1945 | Heit | 280/500 |
| 3,216,735 | 11/1965 | Larson | 280/491 R |
| 3,806,161 | 4/1974 | Pollaurt | 280/500 |
| 4,204,701 | 5/1980 | Oltrogge | 280/491 E |

FOREIGN PATENT DOCUMENTS 180990 12/1917 Canada ............................. 280/511

Primary Examiner—John J. Love
Assistant Examiner—Everett Diederiks
Attorney, Agent, or Firm—Harvey B. Jacobson; Clarence A. O'Brien

[57] ABSTRACT

A rectangular mounting plate is provided for mounting on the outer surface of a vehicle bumper in slightly spaced relation relative thereto and in the usual license plate mounting location. The mounting plate includes structure for supporting a license plate therefrom in position overlying the outerface of the mounting plate and a support plate is provided including structure defining opposing channels extending along opposite marginal portions thereof in which the corresponding marginal portions of the mounting plate are slidingly receivable, whereby the support plate may be slidingly engaged over the mounting plate. Further, the support and mounting plates include structure for releasably retaining the support plate in positions supported from the mounting plate in substantially full registry therewith and the support plate includes outstanding hitch structure to which the hitch construction on the forward end of the trailer tongue may be removably universally coupled.

7 Claims, 5 Drawing Figures

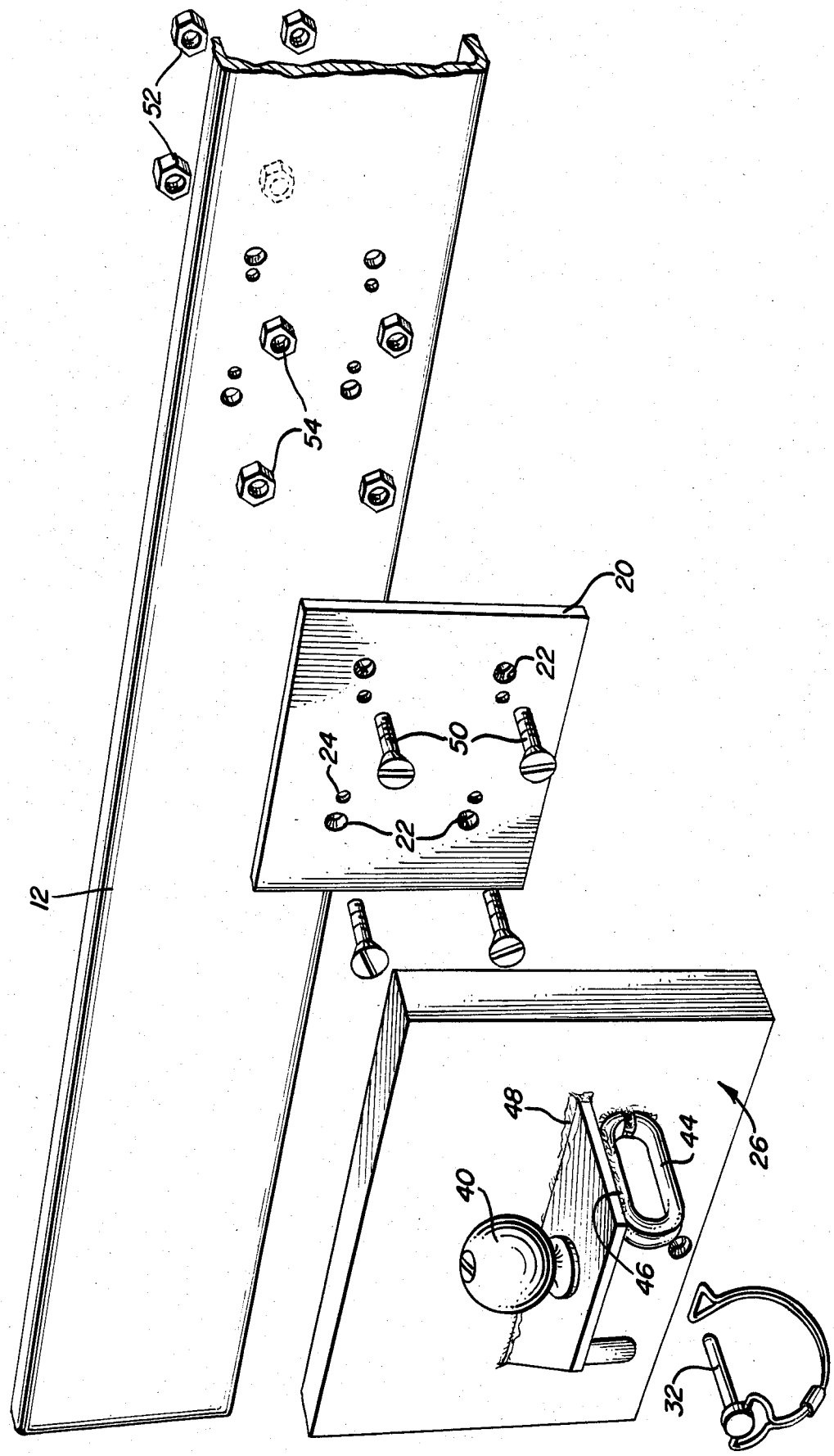

REMOVABLE HITCH

BACKGROUND OF THE INVENTION

1. Field of the Invention

This invention relates to a bumper hitch including a mounting plate for mounting from the outer face of a vehicle bumper in the usual mounting location of the vehicle license plate. The mounting plate is supported from the bumper in slightly spaced relation and includes structure for mounting a license plate therefrom overlying the outer face of the mounting plate. The hitch further includes a support plate including remote channel portions opening toward each other and slidingly engageable with corresponding remote marginal portions of the mounting plate for support of the support plate from the mounting plate in overlying relation relative to the license plate supported therefrom. The support plate includes a tow hitch mounted therefrom projecting outwardly of its outer face and structure is provided for releasably preventing shifting of the support plate from supported engagement with the mounting plate. Although the hitch may be used on the rear of a vehicle its primary use will be on the front of a vehicle when maneuvering a trailer through close quarters and in an off-road situation in which visibility of the front license plate of the vehicle being obscured by the support plate of the hitch is unimportant.

2. Description of Related Art

Various different forms of trailer hitches heretofore have been provided including some of the general structural and operational features of the instant invention and including at least a few designed for use on the front of a vehicle. However, these previously known forms of trailer hitches are not of a type wherein the hitch element feature thereof may be quickly removed to expose an underlying license plate and to give very little appearance of any portion of a trailer hitch when the hitch member support plate is removed and stored within the associated vehicle.

Examples of previously known trailer hitches incorporating some of the features of the instant invention are disclosed in U.S. Pat. Nos. 2,622,892, 2,840,392, 3,716,255, 3,741,588, 3,885,817, 4,204,701 and 4,266,799.

However, these previously known forms of hitches do not include the overall combination of structural features of the instant invention which enable a trailer hitch ball to be readily removably supported from the front bumper of a vehicle in the usual location of the license plate of the vehicle and without requiring removal of the license plate.

SUMMARY OF THE INVENTION

The removable hitch of the instant invention includes a support plate from which a ball hitch member or other hitch construction is supported and with the support plate being constructed in the form of a channel member for sliding engagement with and support from a mounting plate mounted on the front bumper of a vehicle in the usual location of the front license plate of the vehicle. The mounting plate includes structure by which the usual license plate may be mounted on the outer face of the mounting plate and the support plate is constructed in a manner whereby it may be slidingly and telescopingly engaged over not only the mounting plate but also the license plate supported therefrom.

The main object of this invention is to provide a readily removable hitch which may be used on the front end of a vehicle for maneuvering trailers in close quarters.

Another object of this invention is to provide a removable trailer hitch in accordance with the preceding object and incorporating mounting structure therefor enabling ready removable support of the hitch from an associated vehicle and with the mounting structure being substantially in the form of a license plate mounting bracket for the usual front license plate of the vehicle.

Yet another important object of this invention is to provide a removable hitch in accordance with the preceding objects and which may also be used on the rear or a vehicle.

A further object of this invention is to provide a removable trailer hitch which may be mounted upon substantially any vehicle front or rear bumper in the location of the usual license plate mounting bracket or license plate.

A final object of this invention to be specifically enumerated herein is to provide a removable trailer hitch in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an exploded perspective view of the removable hitch; and

DESCRIPTION OF THE PREFERRED EMBODIMENTS

Figure 1:
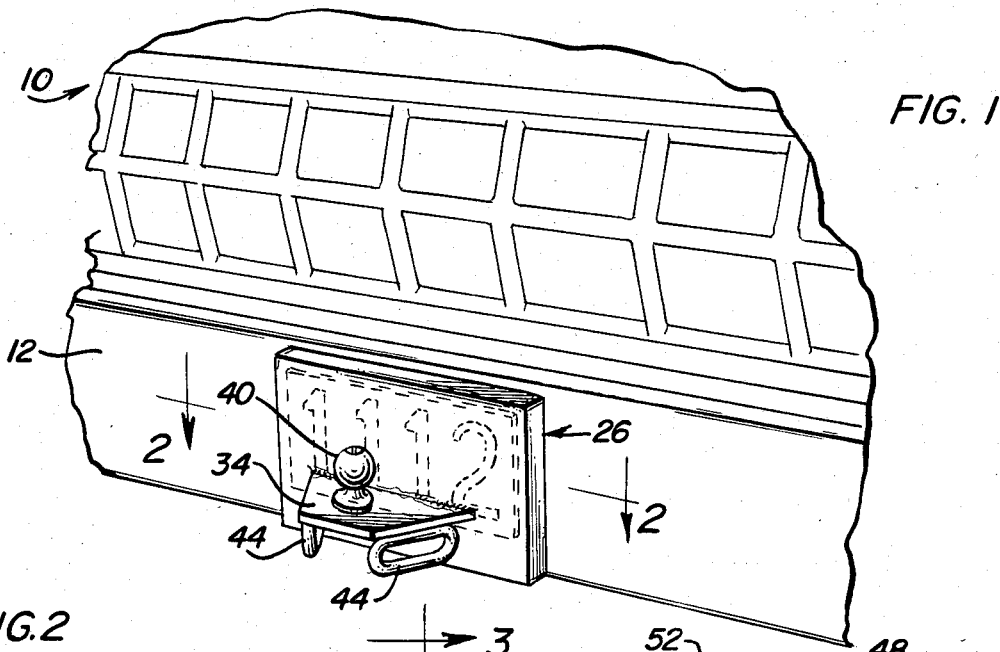
FIG. 1 is a fragmentary perspective view of the front end of a pickup truck or other motor vehicle with the removable hitch of the instant invention mounted upon the front bumper of the vehicle.
Figure 2:
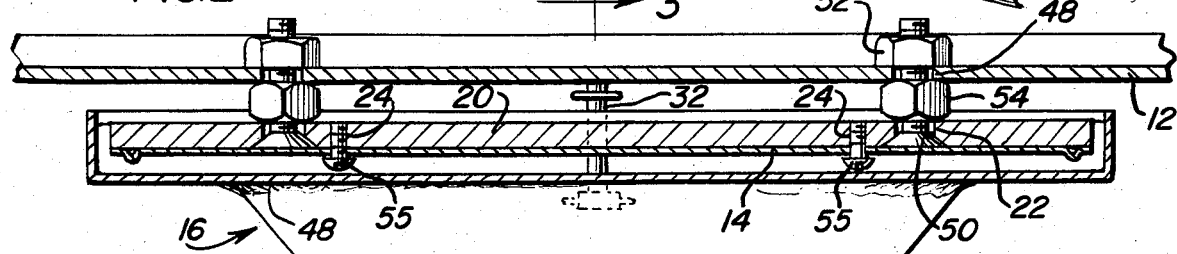
FIG. 2 is an enlarged fragmentary horizontal sectional view taken substantially upon the plane indicated by the section line 2—2 of FIG. 1.
Figure 3:
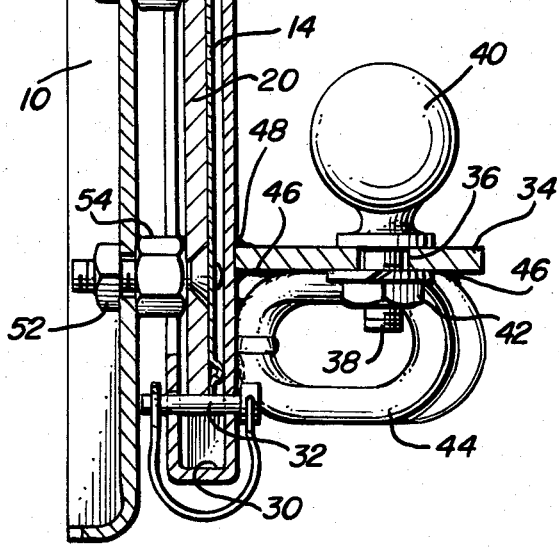
FIG. 3 is a vertical sectional view taken substantially upon the plane indicated by the section line 3—3 of FIG. 2.

Referring now more specifically to FIGS. 1–4 of the drawings the numeral 10 generally designates a conventional form of pickup truck including a front bumper 12 upon whose outer face a conventional vehicle license plate 14 is customarily flush mounted.

A first form of bumper hitch is referred to in general by the reference numeral 16 and includes a substantially flat and rectangular mounting plate 20 having counter sunk bores 22 formed through the four corner portions thereof as well as four small threaded bores 24 formed therethrough. The bumper hitch 16 additionally includes a support plate referred to in general by the reference numeral 26 and which is slightly larger in plan area than the plate 20. The support plate 26 defines rear side downwardly and upwardly opening upper and lower channels 28 and 30 which open toward each other across the rear side of the plate 26 and the lower channel 30 is of a greater depth than the upper channel 28. In addition, a removable transverse pin 32 is provided and extends across the central portion of the lower channel 30 and is removable from the forward side of the support plate 26.

The forward or front side of the support plate 26 includes a forwardly projecting horizontal flange 34 having a verticle bore 36 formed therethrough and the lower mounting shank portion 38 of a ball hitch member 40 is secured downwardly through the flange 34 by a nut 42. In addition, heavy duty safety chain anchoring loops 44 are secured to opposite side under portions of the flange 34 and to the forward side of the support plate 26 below the flange 34 in any convenient manner such as by welding 46, the flange 34 being welded to the support plate 26 as at 48.

In order to mount the mounting plate 20 from the bumper 12 the conventional license plate 14 is removed and suitable bores 48 are formed through the bumper 12 in a pattern registering with the pattern of the bores 22. Then, headed fasteners 50 including countersunk heads are secured through the bores 22 and 48 by threaded nuts 52 and threaded spacer nuts 54 are threaded on the fasteners 50 between the front face of the bumper 12 and the rear face of the mounting plate 20. In this manner, the mounting plate 20 is securely fastened to the bumper 12 in spaced relation relative thereto.

At this point, small threaded fasteners 55 may be used to reattach or remount the license plate 14 on the front side of the mounting plate 20 with the fasteners 55 being threaded into the threaded bores 24. Thereafter, with the pin 32 removed, the lower channel 30 may be engaged with the lower marginal edge of the mounting plate 20 with the upper channel 28 disposed forward of the upper marginal edge of the mounting plate 20. Thereafter, the support plate 26 is raised to seat the lower marginal edge of the mounting plate 20 within the channel 30, the upper marginal portion of the support plate 26 is swung rearwardly to vertically register the upper channel 28 with the upper marginal edge of the mounting plate 20 and the support plate 26 is then lowered until the upper marginal edge of the mounting plate 20 seats in the channel 28, the lower marginal edge of the mounting plate 20 being still received within the channel 30. Thereafter, the pin 32 is installed to thereby prevent unwanted upward displacement of the support plate 26 relative to the mounting plate 20. At this point, the ball hitch element of a trailer may be releasably coupled to the ball hitch element 40 and the trailer safety chains may be anchored relative to the loops 44.

Although the support plate 26 overlies the conventional license plate 14, the removable hitch 16 is used only in off-road situations when it becomes necessary to maneuver an associated trailer in close quarters. As soon as maneuvering of the trailer has been accomplished, it is merely necessary to remove the pin 32, lift the support plate 26 and to thereafter swing the channel 28 forward of the mounting plate 20 and to then lower the support plate 26 to effect full disengagement of the support plate and element 40 from the mounting plate. The support plate 26 and element 40 may then be stored within the vehicle 10, the license plate 14 then being in full view. It is also pointed out that the mounting plate 20 is of substantially the same size as the license plate 20 and therefore that the license plate 20 substantially fully covers the mounting plate 20 and the appearance of the forward end of the vehicle 10 is the same as though it did not have the mounting plate 20 of the hitch 16 supported therefrom.

Figure 5:
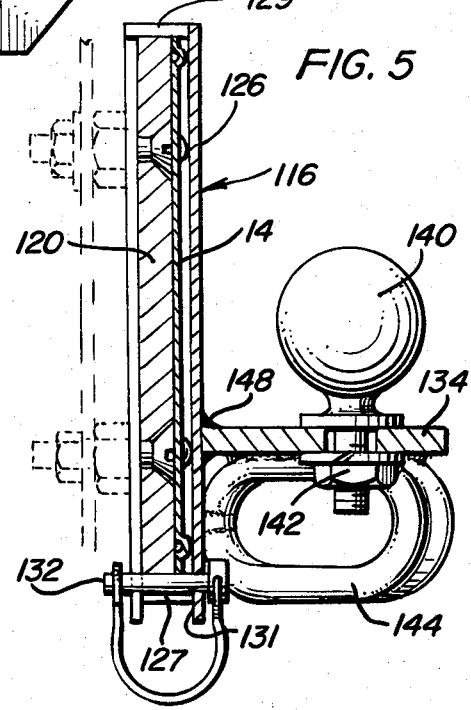
FIG. 5 is a vertical sectional view similar to FIG. 3 and illustrating a modified form of the invention.

With attention now invited more specifically to FIG. 5 of the drawings there may be seen a modified form of hitch referred to in general by the reference numeral 116. The hitch 116 is substantially identical to the hitch 16, except that the support plate 126 thereof differs slightly from the support plate 26. The various components of the hitch 116 corresponding to similar components of the hitch 16 are designated by reference numerals in the 100 series corresponding to the reference numerals given those similar components of the hitch 16.

The support plate 126 includes, in lieu of upper and lower channels corresponding to the channels 28 and 30, opposite side vertically extending channels 127 which snuggly embrace the opposite side vertically extending marginal portions of the mounting plate 120. The upper ends of the opposite side channels 127 are closed by upper opposite side plate portions 129 and the latter are downwardly abutted against the opposite ends of the upper marginal portion of the mounting plate 120 when the support plate 126 is in its operative position. The pin 132 of the hitch 116 is merely received through a bore provided therefore in a central downward extension 131 carried by the lower marginal portion of the support plate 126. Otherwise, the hitch 116 is substantially identical to the hitch 16.

In order to remove the support plate 126, it is merely necessary to remove the pin 132 and to upwardly displace the support plate 126 in a vertical direction until the lower ends of the channels 127 are raised above the upper ends of the opposite side marginal portions of the mounting plate 20. Here again, the license plate 14 is supported from the mounting plate 120 in the same position in which the license plate 14 is supported from the mounting plate 20.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A removable bumper hitch including a mounting plate having first and second sides and including mounting means for mounting said plate from the outwardly facing surface of a vehicle bumper in slightly spaced relation relative thereto with said first side opposing said surface of said bumper, a hitch member support plate defining channel means for slidingly engaging at least two remote marginal portions of said mounting plate and with said support plate being slidingly engageable over said mounting plate to a position in closely juxtaposed registered position relative thereto and slightly spaced relative to and opposing said second side of said mounting plate, said plates including co-acting means releasably anchoring said plates in registered position against shifting of said support plate relative to said mounting plate, the side of said support plate remote from said mounting plate including outstand hitch means mounted therefrom, said space between the two opposing sides of said mounting and support plates being sufficient to receive a license plate therebetween, said mounting plate including means for supporting a license plate therefrom overlying said second side of said mounting plate and disposed between the latter and said support plate.

2. The bumper hitch of claim 1 wherein said co-acting means includes a readily removable latch pin removably secured laterally through said plates.

3. The bumper hitch of claim 1 wherein said support and mounting plates include upstanding opposite side marginal portions, said channel means extending along said upstanding marginal portions of said support plate with aaid channel means defining channels opening toward each other on the side of said support plate opposing said mounting plate.

4. The bumper hitch of claim 3 wherein the lower ends of said channels are open, and downwardly facing abutment means closing the upper ends of said channels and engageable with a top portion of said mounting plate to limit downward shifting of said support plate relative to said mounting plate.

5. A removable bumper hitch including a mounting plate having first and second sides and including mounting means for mounting said plate from the outwardly facing surface of a vehicle bumper in slightly spaced relation relative thereto with said first side opposing said surface of said bumper, a hitch member support plate defining channel means for slidingly engaging at least two remote marginal portions of said mounting plate and with said support plate being slidingly engageable over said mounting plate to a position in closely juxtaposed registered position relative thereto and slightly spaced relative to and opposing said second side of said mounting plate, said plates including co-acting means releasably anchoring said plates in registered position against shifting of said support plate relative to said mounting plate, the side of said support plate remote from said mounting plate including outstanding hitch means mounted therefrom, said support plate including a lower marginal edge portion, said outstanding hitch means including a generally horizontal hitch plate projecting outwardly from said support plate above the lower marginal edge portion thereof and having a hitch member supported therefrom, a pair of anchor loops disposed in upright planes and secured to the underside of said hitch plate and said support plate, said anchor loops serving not only as gusset plates establishing reinforcement between said hitch plate and said support plate, but also functioning as safety chain anchor portions.

6. A removable bumper hitch including a mounting plate having first and second sides and including mounting means for mounting said plate from the outwardly facing surface of a vehicle bumper in slightly spaced relation relative thereto with said first side opposing said surface of said bumper, a hitch member support plate defining channel means for slidingly engaging at least two remote marginal portions of said mounting plate and with said support plate being slidingly engageable over said mounting plate to a position in closely juxtaposed registered position relative thereto and slightly spaced relative to and opposing said second side of said mounting plate, said plate including co-acting means releasably anchoring said plates in registered position against shifting of said support plate relative to said mounting plate, the side of said support plate remote from said mounting plate including outstanding hitch menas mounted therefrom, said support and mounting plates including upstanding opposite side marginal portions, said channel means extending along said upstanding marginal portions of said support plate with said channel means defining channels opening toward each other on the side of said support plate opposing said mounting plate, said support plate including an upper marginal portion defining a downwardly opening channel on the side of said support plate opposing said mounting plate and in which the upper marginal edge portion of said mounting plate is receivable, the lower marginal portion of said support plate including means defining a lower upwardly opening channel opening toward and registered with said upper channel and in which the lower marginal portion of said mounting plate is receivable, the spacing between the upper and lower limits of said upper and lower channels being greater than the vertical height of said mounting plate, the depth of said lower channel being greater than the depth of said upper channel and the height of said support plate being less than the minimum spacing between said upper and lower channels plus the depth of said lower channel.

7. In combination with an upstanding support plate portion having a lower marginal edge portion and mounted from a vehicle, a tow hitch including a generally horizontal hitch plate having one marginal portion abutted against and secured by welding to said support plate portion above the lower marginal edge portion thereof, said hitch plate including means supporting a hitch element therefrom, a pair of heavy duty anchor loops disposed in upstanding planes and on opposite sides of a vertical plane centered relative to said hitch element and disposed substantially normal to said support plate portion, said anchor loops including horizontally extending upper portions abutted against and welded to said hitch plate and downwardly extending portions abutted against and welded to said support plate portion below said hitch plate, whereby said anchor loops not only define anchor locations for safety chains but also establish rigid reinforcing of the gussett type between said hitch plate and said support plate portion.

* * * * *

UNITED STATES PATENT AND TRADEMARK OFFICE
CERTIFICATE OF CORRECTION

PATENT NO. : 4,607,858
DATED : August 26, 1986
INVENTOR(S) : HOWARD W. WAGNER

It is certified that error appears in the above-identified patent and that said Letters Patent is hereby corrected as shown below:

Title page, Item [73]: in the assignee's name, delete "Woods" and substitute --Woody's--.

Signed and Sealed this

Ninth Day of February, 1988

Attest:

DONALD J. QUIGG

*Attesting Officer*      *Commissioner of Patents and Trademarks*